(12) United States Patent
Milvaney et al.

(10) Patent No.: US 10,979,237 B2
(45) Date of Patent: Apr. 13, 2021

(54) MANAGING NOTIFICATIONS RELATED TO COLLABORATIVELY EDITED ELECTRONIC DOCUMENTS BASED ON USER ROLES

(71) Applicant: Microsoft Technology Licensing, LLC, Redmond, WA (US)

(72) Inventors: Douglas Milvaney, Somerville, MA (US); Hoi Mei Wong, Cambridge, MA (US); Andrew Harris, Somerville, MA (US); Manish Shukla, Lexington, MA (US); Taili Feng, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 484 days.

(21) Appl. No.: 15/338,179

(22) Filed: Oct. 28, 2016

(65) Prior Publication Data
US 2018/0123815 A1    May 3, 2018

(51) Int. Cl.
*H04L 12/18* (2006.01)
*H04L 29/08* (2006.01)
(Continued)

(52) U.S. Cl.
CPC ........ *H04L 12/1827* (2013.01); *G06F 40/166* (2020.01); *G06F 40/197* (2020.01); *G06Q 10/101* (2013.01); *H04L 67/22* (2013.01); *H04L 67/26* (2013.01); *H04L 67/306* (2013.01); *H04L 67/1095* (2013.01)

(58) Field of Classification Search
CPC ..... H04L 12/1827; H04L 67/22; H04L 67/26; H04L 67/306; H04L 67/1095; G06F 17/2288; G06Q 10/101; G06Q 10/103
See application file for complete search history.

(56) References Cited

U.S. PATENT DOCUMENTS 5,706,452 A * 1/1998 Ivanov ................ G06Q 10/107
715/751
6,678,698 B2 * 1/2004 Fredell .................. G06Q 10/06
707/608

(Continued)

OTHER PUBLICATIONS

Ardissono et al, Context-Aware Notification Management in an Integrated Collaborative Environment, Workshop on Adaptation and Personalization for Web 2.0, UMAP'09, Jun. 22-26, 2009 (Year: 2009).*

(Continued)

*Primary Examiner* — Emmanuel L Moise
*Assistant Examiner* — Robert A Shaw
(74) *Attorney, Agent, or Firm* — Alleman Hall Creasman & Tuttle LLP

(57) ABSTRACT

A computer system tracks and analyzes activity data, notifications, and user interactions with activity data and notifications. By analyzing this information, the computer system can identify, for individual users and across a set of users, which activity data and notifications are most relevant. Such activity data and notifications are most relevant when they result in the end user having further user interaction through the electronic document. The information about the relevance of the activity data and notifications can be used for managing sending of notifications and presenting activity data in end user applications.

8 Claims, 12 Drawing Sheets

(51) Int. Cl.
*G06Q 10/10* (2012.01)
*G06F 40/166* (2020.01)
*G06F 40/197* (2020.01)

(56) References Cited

U.S. PATENT DOCUMENTS

| | | | |
|---|---|---|---|
| 7,836,127 B2 | 11/2010 | Deane et al. | |
| 7,941,455 B2 | 5/2011 | Wanigasekara-Mohotti et al. | |
| 8,856,670 B1 | 10/2014 | Thakur et al. | |
| 9,208,153 B1* | 12/2015 | Zaveri | G06Q 10/101 |
| 9,292,833 B2 | 3/2016 | Savage | |
| 9,323,800 B2 | 4/2016 | Xiao et al. | |
| 9,336,213 B2 | 5/2016 | Tadayon et al. | |
| 10,678,866 B1* | 6/2020 | Ranganathan | G06F 16/211 |
| 2002/0184255 A1* | 12/2002 | Edd | G06F 16/958 |
| | | | 715/205 |
| 2003/0088585 A1* | 5/2003 | Moeller | G06F 16/93 |
| 2003/0097410 A1* | 5/2003 | Atkins | H04L 29/06 |
| | | | 709/206 |
| 2003/0167443 A1* | 9/2003 | Meunier | G06F 17/30899 |
| | | | 715/255 |
| 2004/0003352 A1* | 1/2004 | Bargeron | G06F 17/24 |
| | | | 715/230 |
| 2004/0128359 A1* | 7/2004 | Horvitz | H04L 67/26 |
| | | | 709/207 |
| 2006/0117247 A1* | 6/2006 | Fite | G06Q 10/10 |
| | | | 715/230 |
| 2007/0005385 A1* | 1/2007 | Deane | G06Q 10/06 |
| | | | 709/204 |
| 2009/0006936 A1* | 1/2009 | Parker | G06F 17/24 |
| | | | 715/200 |
| 2010/0017701 A1* | 1/2010 | Bargeron | G06F 16/9535 |
| | | | 715/230 |
| 2011/0161425 A1* | 6/2011 | Xiao | G06F 17/30368 |
| | | | 709/206 |
| 2011/0316698 A1 | 12/2011 | Palin et al. | |
| 2012/0192086 A1* | 7/2012 | Ghods | G06Q 10/10 |
| | | | 715/753 |
| 2012/0317214 A1* | 12/2012 | Brunner | G06Q 10/107 |
| | | | 709/206 |
| 2013/0013560 A1* | 1/2013 | Goldberg | G06Q 10/101 |
| | | | 707/634 |
| 2013/0014023 A1* | 1/2013 | Lee | G06Q 10/103 |
| | | | 715/751 |
| 2013/0254699 A1* | 9/2013 | Bashir | G06F 3/0481 |
| | | | 715/772 |
| 2014/0082093 A1* | 3/2014 | Savage | H04L 41/50 |
| | | | 709/206 |
| 2014/0100904 A1 | 4/2014 | Wolf et al. | |
| 2014/0298207 A1* | 10/2014 | Ittah | G06Q 10/00 |
| | | | 715/753 |
| 2015/0100357 A1 | 4/2015 | Seese et al. | |
| 2015/0339627 A1* | 11/2015 | Brunner | G06Q 10/10 |
| | | | 705/345 |
| 2016/0012374 A1* | 1/2016 | Roman | G06Q 10/063112 |
| | | | 705/7.14 |
| 2016/0063840 A1* | 3/2016 | Kumarasamy Mani | |
| | | | H04L 29/06 |
| | | | 709/206 |
| 2016/0072750 A1* | 3/2016 | Kass | H04L 51/14 |
| | | | 709/206 |
| 2016/0357984 A1* | 12/2016 | Van Rotterdam | G06Q 10/10 |
| | | | 705/345 |
| 2017/0048285 A1* | 2/2017 | Pearl | G06Q 10/107 |
| | | | 709/206 |
| 2017/0103066 A1* | 4/2017 | Kisin | H04L 67/06 |
| 2020/0067997 A1* | 2/2020 | Hardee | G06F 40/166 |

OTHER PUBLICATIONS

Ardissono, et al., "Context-Aware Notification Management in an Integrated Collaborative Environment", In Proceedings of the UMAP Workshop Adaptation and Personalization for Web 2.0, Jun. 22, 2009, pp. 21-30.

Fish, et al., "Quilt: a collaborative tool for cooperative writing", in Proceedings of the ACM SIGOIS and IEEECS TC-OA conference on Office information systems, Apr. 1, 1988, pp. 30-37.

Hinze, Annika, "A-mediAS: an adaptive event notification system", In Proceedings of the 2nd international workshop on Distributed event-based systems, Jun. 8, 2003, pp. 1-8.

Newman-Wolfe, et al., "MACE: a fine grained concurrent editor", In Proceedings of the conference on Organizational computing systems, Oct. 1, 1991, pp. 240-254.

\* cited by examiner

Document data 202
  document ID 216
  structure 210
  content 212
  references to related data 214
  other metadata 218

Comments 204
Document ID 206
Comment 1
  Location reference 220
  user ID 222
  content 224
  state 226
  date and time 228
  comment ID 230
...
Comment N Activity History 208
Document ID 209
Action 1 240
  Action ID 241
  Action type 242
  user ID 244
  date and time 246
  other data 248
...
Action N Electronic Document 200

FIG.2

MANAGING NOTIFICATIONS RELATED TO COLLABORATIVELY EDITED ELECTRONIC DOCUMENTS BASED ON USER ROLES

BACKGROUND

The availability of shared storage systems for electronic documents has increased the ability of computer end users to share and to collaborate in the creation of a variety of electronic documents. End users can cause electronic documents to be stored in a shared storage system that is accessible on a computer network, such as the internet. End users can instruct such a shared storage system to allow electronic documents to be shared with other end users of the shared storage system. A shared storage system generally has an access control component in a file system that tracks, for each electronic document, access rights that different end users have for the electronic document.

After an electronic document has been shared among two or more end users, the shared storage system manages access to the shared electronic document to ensure consistency of the electronic document, especially in the case of collaborative editing of, i.e., collaborative modifications to, the electronic document. In some implementations, a collaboration system works with the shared storage system to manage collaborative editing by tracking which end users currently are using end user applications on client computers to access the same electronic document. The collaboration system typically is implemented as one or more computer programs executing on one or more server computers, and, in some implementations, may have components executing on the client computers.

An end user application running on a computer, for the purpose of modifying electronic documents, typically is configured to allow an editor to perform a variety of actions related to electronic documents. For example, an end user may take actions with respect to an electronic document, such as opening, saving, printing, presenting, closing, or sharing an electronic document, and so on. As another example, an end user may take actions that modify the electronic document, thus modifying either its structure or content or both, such as creating, deleting or updating structure and/or content. As another example, a user may take actions with respect to comments in an electronic document, such as adding, editing, or deleting a comment, replying to a comment, or marking a comment as resolved or unresolved. Adding a comment can involve associating a comment with a location within the electronic document or within a general comment section of the electronic document. Any single editor may add multiple comments to an electronic document. When the electronic document is shared, such comments can originate from multiple editors using multiple end user applications.

End users and applications can also take actions related to electronic documents outside of the collaborative editing system. For example, actions may be taken by or through a shared storage system or by or through a communication application. For example, through the shared storage system, a user may take an action with respect to an electronic document, such as deleting, sharing, renaming, moving, or copying it, or changing its permissions, and the like. As another example, a communication application may transmit a copy of an electronic document, or save an electronic document. Yet other applications may access an electronic document, such as for reading and/or printing.

SUMMARY

This Summary is provided to introduce a selection of concepts in a simplified form that are further described below in the Detailed Description. This Summary is intended neither to identify key or essential features, nor to limit the scope, of the claimed subject matter.

A collaboration system, or other service provided by a computer system associated with the collaboration system, may use information about the actions performed by end users to provide notifications to other end users about those actions. In collaboration systems with a large number of end users and a large number of electronic documents, notifications for actions taken by the end users on the electronic documents can become unwieldy, both for a single document when the document is heavily edited, and across collections of documents.

A computer system tracks and analyzes activity data, notifications, and user interactions with activity data and notifications. By analyzing this information, the computer system can identify, for individual users and across a set of users, which activity data and notifications are most relevant. Such activity data and notifications are most relevant when they result in the end user having further user interaction through the electronic document. The information about the relevance of the activity data and notifications can be used for managing sending of notifications and presenting activity data in end user applications.

For example, to manage complexity of generating notifications in response to multiple actions from multiple editors associated with multiple electronic documents, a notification service generates notifications based on actions related to an electronic document and roles of end users for whom notifications of such actions can be sent. The notification services stores and accesses data associating actions with roles. Given an action related to an electronic document, the notification service generates a list of candidate recipients by identifying entities having the role or roles associated with the action and with respect to the electronic document for which the action occurred. As the role of an end user with respect to an electronic document changes over time, the notifications sent to that user for that electronic document adapt based on that end user's role with respect to that electronic document.

In the following description, reference is made to the accompanying drawings which form a part hereof, and in which are shown, by way of illustration, specific example implementations. Other implementations may be made without departing from the scope of the disclosure.

BRIEF DESCRIPTION OF THE DRAWINGS

FIG. 2 is a diagram of illustrative example of data structures for storing comment data and activity data for an electronic document.

DETAILED DESCRIPTION

Figure 1:
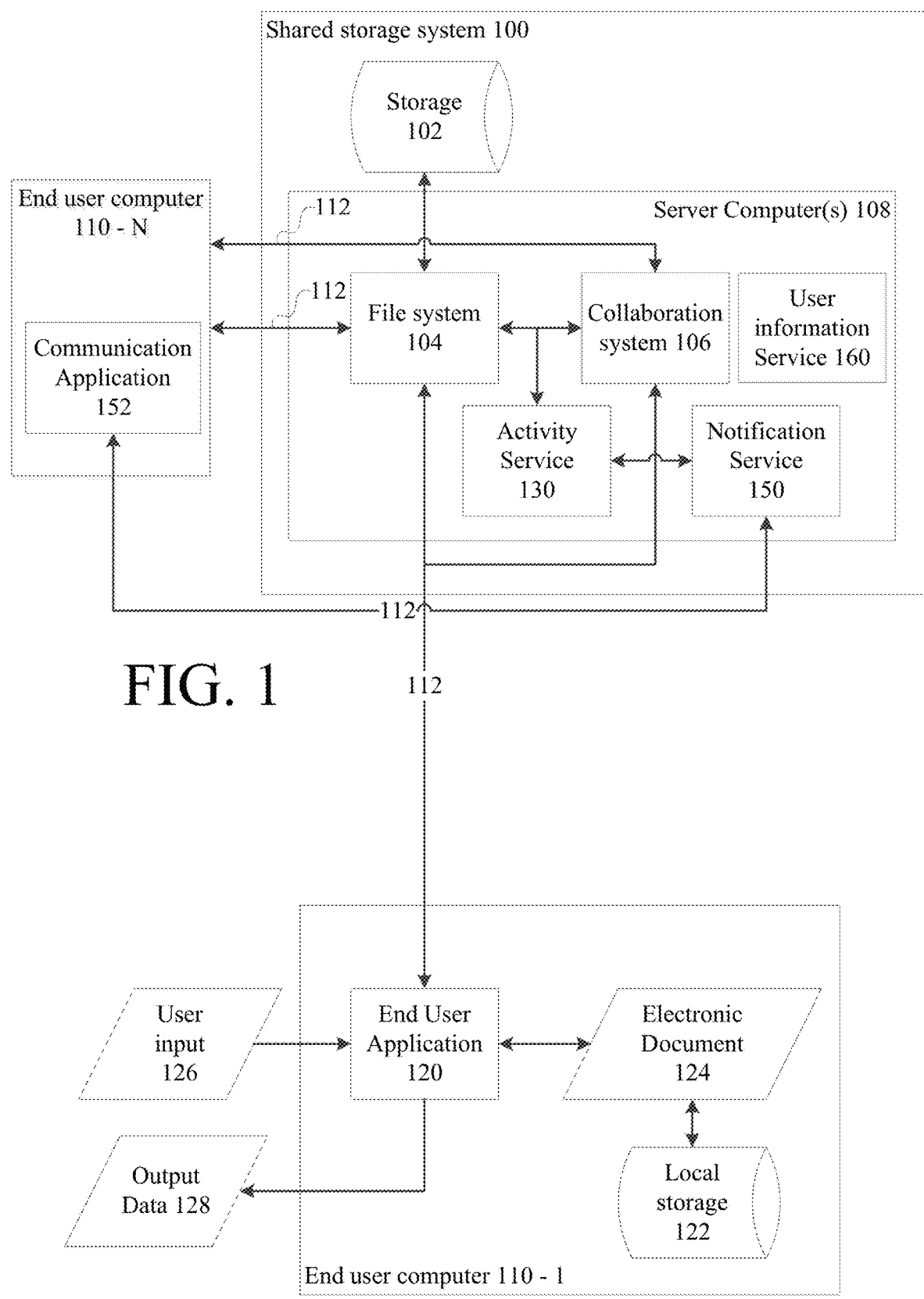
FIG. 1 is a block diagram of an example computer system configured to support collaborative editing of electronic documents through end user applications on multiple client computers.

FIG. 1 is a block diagram of an example computer system configured to support sharing of electronic documents among end users, and collaborative editing of electronic documents by multiple end users through end user applications on multiple client computers, and which provides notification services to end users of actions related to those electronic documents.

Such a computer system can include a shared storage system 100. The shared storage system 100 generally includes storage 102 in which data is stored in data files on a computer storage device accessible through a file system 104 that is part of the shared storage system. The file system configures one or more server computers 108 to store and maintain information about each file stored in the storage 102. The shared storage system 100 can be implemented using one or more general purpose computers, such as described in connection with FIG. 12, configured to implement one or more server computers. The shared storage system 100 is responsive to requests from end user computers 110 over one or more computer network(s) 112 to access, through the file system 104, files on the storage 102.

Multiple end user computers 110-1 to 110-N, also called client computers herein, are connected to the shared storage system for communication over one or more computer networks 112, such as the internet or a private computer network. An end user computer 110 can be implemented using a general purpose computer, such as described in connection with FIG. 12, configured as a client computer running one or more end user applications 120, a communication application 152 or yet other applications (not shown). Examples of such a computer include, but are not limited to, a tablet computer, a slate computer, a notebook computer, a desktop computer, a virtual desktop computer hosted on a server computer, a handheld computer, game console, and a mobile phone including a computer and applications.

The computer network(s) 112 can be any computer network supporting interaction between the end user computers and the shared storage system, such as a local area network or a wide area network, whether private and/or publicly accessible, and can include wired and/or wireless connectivity. The computer network can be implemented using any of a number of available network communication protocols, including but not limited to Ethernet and TCP/IP.

An end user computer 110 can include one or more end user applications 120 and/or one or more communication applications 152, even though FIG. 1 only shows one end user application 120 and one communication application for simplicity. In this context, an end user application 120 is a computer program executed on the end user computer that configures the computer to be responsive to user input 126 to allow an end user to interactively modify an electronic document 124. An electronic document can include any kind of data, such as text, still images, video, or audio and combinations of these, and generally has data defining structure of the electronic document and data defining content of the electronic document within the defined structure. The end user application processes the electronic document in response to user input received from input devices. For example, the end user application combines data to create the structure and content of the electronic document. The end user application also displays or otherwise presents output data 128, such as a graphical user interface including the content according to the structure of the electronic document, through output devices (not shown) to the end user. The end user application also stores the electronic document in memory and/or in a data file in local storage 122 of the end user computer and/or in the shared storage system 100.

A variety of kinds of end user applications can be used on an end user computer. Examples of an end user application include, but are not limited to, a word processing application, a presentation application, a note taking application, a text editing application, a paint application, an image editing application, a spreadsheet application, a desktop publishing application, a drawing application, a video editing application, and an audio editing application. An end user application can permit a variety of operations on an electronic document, such as, but not limited to, viewing and commenting without content editing, viewing and content editing, or viewing only.

As noted above, an end user application 120 generates an electronic document 124 that is stored in a data file, which can be stored in local storage 122 and/or the shared storage system 100. The electronic document, while being modified by an end user on the end user computer, also is temporarily stored in memory on the end user computer. The end user application also may temporarily store the electronic document in a cache on local storage before committing changes to the electronic document to the data file. The client computer may have an application that coordinates with the shared storage system 100 to save the electronic document on the shared storage system 100, an example of which is described in more detail below in connection with FIG. 4.

For an electronic document stored in a data file in a shared storage system 100, the file system 104 of the shared storage system can include information indicating a sharing state of the electronic document. Such information can be in the form of access controls indicating which end users are authorized to access the electronic document and its related data.

The file system 104 also can be configured to be responsive to a query to provide this information to another application associated with the shared storage system, such as a collaboration system 106, an activity service 130, a notification service 150, or a user information service 160, or other service on the shared storage system, or applications on end user computers, such as an end user application 120, a communication application 152, or other application. The file system 104 also can provide a mechanism to change the sharing state of an electronic document, either directly through the shared storage system or indirectly through another application, in a number of ways.

In some implementations, electronic documents also can be shared by users by distributing a copy of the electronic document through various distribution channels among multiple users. Such sharing generally involves an application accessing the electronic document through the file system 104 to obtain either a copy of the electronic document or a resource identifier, such as a uniform resource identifier or file name, for accessing the electronic document through the shared storage system 100.

In some implementations, when an electronic document stored in the shared storage system is shared, with modification rights, with multiple end users, two or more end user applications on two or more client computers can access and can attempt to modify the electronic document through the shared storage system 100. To handle such a condition, the shared storage system can include a collaboration system 106. The collaboration system 106 is a computer program that configures the server computer to manage contemporaneous access to shared electronic documents in the shared storage system 100. The collaboration system 106 can store information about end user applications, and associated end users, that currently are accessing the electronic document.

Using the information about end user applications and end users currently accessing an electronic document, the collaboration system can implement any of a number of different techniques for coordinating access to the electronic document to ensure consistency of the electronic document. For example, the collaboration system can prevent one end user application from causing modifications to be written to a data file for an electronic document while another the data file is open for writing by another end user application. As another example, the collaboration system can interactively merge changes to the electronic document as such changes are being made collaboratively through multiple end user applications. In such a case, as an example, the collaboration system can merge changes received from end user computers in memory local to the collaboration system, and then can transmit a modified version of the electronic document to each end user computer with an application currently accessing the document.

The end user application 120 running on an end user computer 110, for the purpose of modifying electronic documents, typically is configured to allow an editor to perform a variety of actions related to electronic documents. Generally, each user can modify the electronic document, possibly adding comments to the electronic document and performing other actions with respect to the document, and then can share the modified electronic document with additional users. For example, an end user may take actions with respect to an electronic document, such as opening, saving, printing, presenting, closing, or sharing an electronic document, and so on. As another example, an end user may take actions that modify the electronic document, thus modifying either its structure or content or both, such as creating, deleting or updating structure and/or content, and/or updates of activity data associated with the electronic document. As another example, a user may take actions with respect to comments in an electronic document, such as adding, editing, or deleting a comment, replying to a comment, or marking a comment as resolved or unresolved. Adding a comment can involve associating a comment with a location within the electronic document or within a general comment section of the electronic document. Any single editor may add multiple comments to an electronic document. When the electronic document is shared, such comments can originate from multiple editors using multiple end user applications.

End users and applications can also take actions related to electronic documents outside of the collaborative editing system. For example, actions may be taken by or through a shared storage system or by or through a communication application. For example, through the shared storage system, a user may take an action with respect to an electronic document, such as deleting, sharing, renaming, moving, or copying it, or changing its permissions, and the like. As another example, a communication application may transmit a copy of an electronic document, or save an electronic document. Yet other applications may access an electronic document, such as for reading and/or printing.

In such collaborative systems, it is often desirable to provide a way to notify end users when actions are taken related to electronic documents they care about. To this end, the shared storage system 100 can include an activity service 130, which can track and store activity data, which is information about actions related to electronic documents, and a notification service 150, which can generate notifications to end users based on such activity data. An end user computer 110 can include one or more communication applications 152 which can receive such notifications over a computer network 112.

Given the activity data from the activity service 130, the notification service 150 can notify end users of various actions taken by other end users. Implementations of such systems also will vary at least in the manner in which such notifications are delivered, such as through electronic mail, text messaging, notification protocols and other communication systems, depending on the communication application of a user. In some implementations, how a notification is delivered can be a setting for a user, identifying, for example, a communication application and/or message format and/or destination to which notifications are to be sent.

Example implementations of the activity service 130 and notification service 150 are described in more detail below; the communication application 152 will now be described.

A communication application is a computer program executed on the end user computer that configures the computer to be responsive to user input to allow an end user to interactively receive and read, or compose and send, electronic messages. The communication application 152 and the end user application 120 used by an end user can be on different end user computers 110. The communication application can present display data (not shown), such as a graphical user interface including electronic messages, through output devices of the end user computer to the end user. An electronic message can include any kind of data, such as text, still images, video, or audio and combinations of these, and generally includes identifiers for a sender and one or more recipients of the electronic message.

A variety of kinds of communication applications can be used on an end user computer. Examples of a communication application include, but are not limited to, an electronic mail application, an instant messaging application, a chat application, a real time voice and/or video communication application, or other application that can provide messages to an end user on the end user computer.

The notification service 150 can be any kind of communication service that can send a message to a communication application 152 on an end user computer over the computer network 112. Example communication services include but are not limited to an email server, a notify service, a chat service, a real time voice and/or video communication service, an instant messaging service or other communication service. The notification service 150 also can receive information from the communication application 152 indicating, for example, user actions taken with respect to the notifications and/or user state such as whether the user is currently using the communication application. The communication application 152 and/or the notification service 150 can include a user interface through which an end user can configure how the notification service generates and transmits notifications for that end user.

Thus, in one example configuration, the communication application 152 is an application on a mobile phone that processes notifications, and the notification service 150 generates notifications to such an application. In another example configuration, the communication application 152 is an electronic mail application, and the notification service 150 generates electronic mail messages for such an application, optionally including a request for a read receipt.

In this context, to send notifications, generally speaking, a notification service processes the activity data from the activity service to generate and transmit corresponding notifications about the corresponding actions to end users. In collaboration systems with a large number of end users and a large number of electronic documents, notifications for actions taken by the end users related to the electronic documents can become unwieldy. Specifically, a large number of messages would be generated if all actions result in notifications to all end users of each electronic document. Such message generation results in high utilization of many resources, including but not limited to processing, storage, bandwidth and power, by the notification service, intermediate devices that process messages, such as servers and networking equipment, and end user devices that receive messages. The volume of messages can be large for a single document when the document is heavily edited, and can be large across collections of documents.

To manage complexity of generating notifications in response to multiple actions from multiple end users associated with multiple electronic documents, a notification service generates notifications based on actions related to an electronic document and roles of end users for whom notifications of such actions can be sent. The notification service accesses data associating actions with roles. Given an action related to an electronic document, the notification service generates a list of candidate recipients by identifying entities having the role or roles associated with the action and with respect to the electronic document for which the action occurred. The notification service may access a user information service 160 for such user role information. A user information service can be implemented, for example, as a list of information about end users of a service, and relationship of those end users with other end users. Such information can be static, such as a contact list or address book, and/or can be dynamic based on analyses of interactions among users with respect to electronic documents through end user applications and/or with respect to communications through communication applications.

Because the role of an end user with respect to an electronic document can change over time, the notifications sent to that user for that electronic document adapt based on that end user's role with respect to that electronic document. Given a user identifier of an end user from the list of candidates, and given other parameters for sending notifications to that end user, such as a preferred communication application 152, the notification service then sends generates and sends notifications to that end user based on activity data from the activity service 130.

More details of an example implementation of the activity service 130, user information service 160, and notification service 150 will be described below in connection with FIGS. 5-11, after further explanation of an example operating environment including a collaborative editing system.

A particular example implementation of the shared storage system, collaborative editing system, and corresponding end user application, will now be described in connection with FIGS. 2-4. It should be understood that this is just one example implementation, and that many other implementations are possible. This example illustrates an end user application that generates activity data and comment data in response to user input, including data structures, graphical user interface and application architecture supporting communication of such data to both the shared storage system and the end user. This is one example implementation of a context in which the activity service 130 and notification service 150 of FIG. 1 can operate.

The data representing an electronic document can be stored in computer storage in a number of different formats. On the one hand, there can be a file format for one or more data files for storing data for an electronic document in persistent storage. On the other hand, there can be one or more data structures stored in memory for providing access to the data for the electronic document by an end user application during editing or viewing of the electronic document. The file format can be and typically is different from the data structure that is stored in memory, yet both store essentially the same data.

An example implementation of data representing an electronic document will now be described in connection with FIG. 2. In FIG. 2, in general, and whether in a data file in persistent storage or data structure in memory, the data 200 for the electronic document includes document data 202, representing structure and content of the electronic document, comment data 204, representing structure and content of comments, and activity data 208 representing actions related to the electronic document taken by end users.

With respect to an example file format, in one implementation, the document data 202 and the comment data 204 can be stored in one data file, and activity data 208 can be stored in a separate second data file. Comment data, in one implementation, can be stored within the electronic document data file, for example as a stream of data within the data file. In this implementation, the data defining the structure and content of the data file can be stored as a separate stream within the data file. In another implementation, the document data 202, the comment data 204, and the activity data 208 all can be stored in a single data file. In another implementation, the document data 202, the comment data 204, and the activity data 208 each can be stored in separate data files or other data storage such as a database. By storing comment data, activity data and other types of data within the same file as the electronic document, such data can be transmitted with the electronic document through other channels to other users. When such data is stored separately, access controls also can be applied separately to such data. For example, access controls can be applied to such data so that only users with whom the electronic document is shared in a shared storage system with access rights, have access to the additional comment data, activity data or other types of data. For example, this additional data can be stored in a database, for example in a key-value pair format, such as a JavaScript Object Notation (JSON) or similar format.

When such data (as shown in FIG. 2) is read by an application, such as an end user application, a communication application, a notification service, an activity service, shared storage system, or other application, the application may generate corresponding data structures in memory. In the end user application, such data in the data structures can be modified in memory in response to user actions. The end user application in turn processes and stores the data structures into the data files at periodic intervals and/or in response to an instruction received from an end user.

Generally speaking, the document data 202 for the electronic document includes a document identifier 216, data defining the structure 210 of the electronic document, and data defining the content 212 within that structure of the electronic document. There is a wide variety of formats for electronic documents, including various markup languages, such as the hypertext markup language (HTML), standard generalized markup language (SGML), extensible markup language (XML), as well as proprietary document formats. The invention is not limited to any particular format for the structure and content of the electronic document. The data for an electronic document may include references to other data related to the electronic document 214, such as files storing comment data, activity data, style sheets for formatting the document, templates, macros and the like. The data for an electronic document also may include various metadata 218 about the electronic document.

Comment data 204 defining a collection of comments can include a document identifier 206 indicating the electronic document to which the collection of comments is related. The comment data can include, for each comment, a reference 220 to a location within the electronic document, a user identifier 222 of the end user that added the comment, and content 224 of the comment, which is typically text but is not limited to text. The reference 220 to a location in a document can be, for example, an offset within the electronic document, such as an offset within the content associated with a structural element of the electronic document. The user identifier can be any indication of a user, such as an email address, user name, etc., such as the user name for the user to access the shared storage system that stores the electronic document. State information 226 also can be associated with a comment, such as data indicating whether the comment has been resolved. A comment also can have an associated date and time stamp 228 indicating when the comment was added to the electronic document. The comment can have a comment identifier 230 that distinguishes the comment from other comments associated with the electronic document.

Comments can be threaded, such that a comment refers to another comment, perhaps in the form of a reply. There are a variety of ways to implement comment threading, such as using the reference 220 of a first comment to refer to a comment identifier 230 of another comment, or using a linked list to represent a comment and any reply comments associated with it.

Activity data 208 defining a collection of actions associated with an electronic document can include a document identifier 209 indicating the electronic document to which the collection of actions is related. The activity data can include, for action 240, an action identifier 241, data indicating a type of action 242, a user identifier 244 of the end user associated with the action, and a date and time stamp 246 indicating when the action occurred. As in the comment data, the user identifier can be any indication of a user, such as an email address, user name, etc., such as the user name for the user to access the shared storage system that stores the electronic document. The type of action 242 can indicate, for example, whether the action is a type of action with respect to the electronic document, a type of action with respect to structure and/or content, activity data, or comment data, or other type of action. Other data 248, such as text or other information, can be stored as part of the data describing the action 240.

The activity data can represent a variety of different kinds of actions performed by users through the end user application and associated with the electronic document. Such actions can include actions with respect to an electronic document, for example, opening, saving, printing, presenting, closing, or sharing an electronic document, and so on. As another example, an end user may take actions that modify the electronic document, thus modifying either its structure or content or both, such as creating, deleting or updating structure and/or content, and/or updates to activity data associated with the electronic document. Actions also can be actions with respect to comments, such as adding, editing, or deleting a comment, replying to a comment, or marking a comment as resolved or unresolved. Actions also can include other types of actions such as messages between or among users associated with the electronic document that are not associated with any particular location in the electronic document. When the activity data is stored separately from the electronic document, the activity service 130 can store activity data from other sources as well, such as from the file system or other applications not interacting through the collaborative editing system. In such a case, the activity data can represent a larger range of possible actions related to a document.

Figure 3:
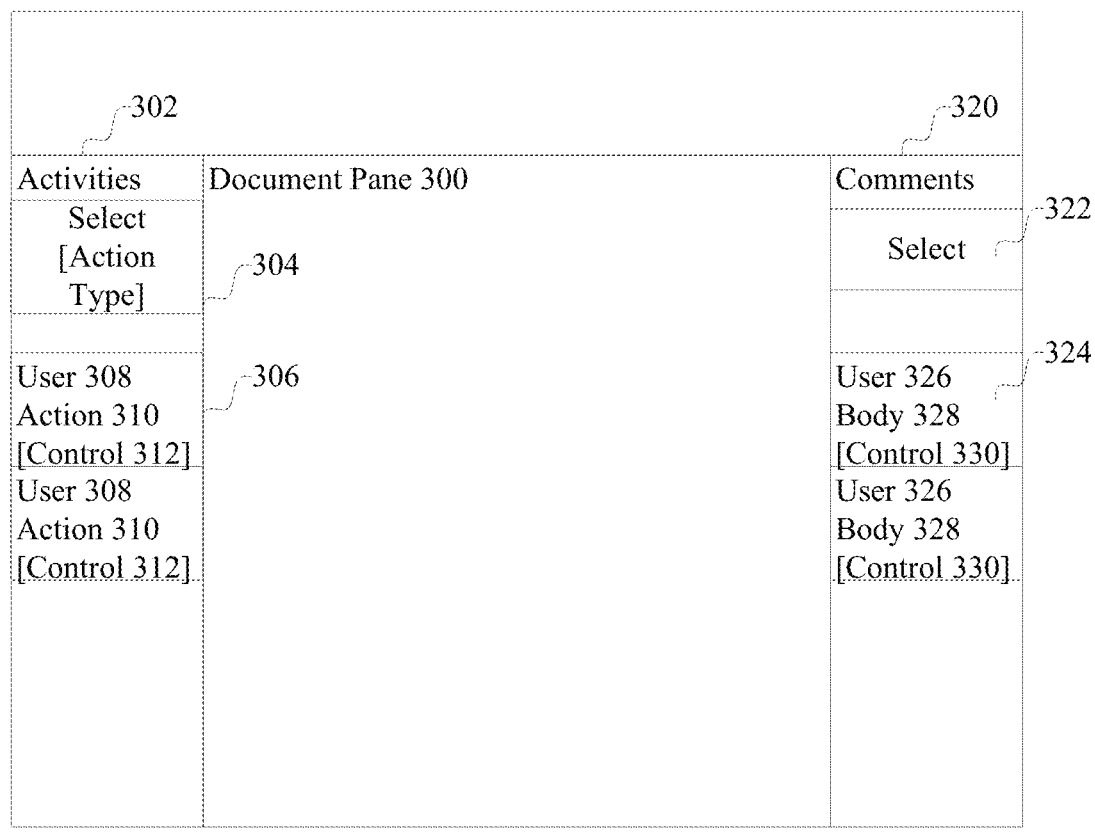
FIG. 3 is an illustration of an example graphical user interface for displaying comment data and activity data for an electronic document in an end user application.

In FIG. 3, an example graphical user interface for an end user application is shown. In this example graphical user interface, a document pane 300 is a primary display area in which the electronic document is presented on a display. The end user computer receives user inputs through one or more input devices, and can associate such inputs with operations with respect to the electronic document in document pane 300, or with respect to other graphical elements in the graphical user interface. The end user computer processes some user inputs to effect modifications to the structure and/or content of the electronic document currently being accessed in the document pane 300.

The graphical user interface for the end user application can include an activity pane 302 in which the end user application displays activity data associated with the electronic document. In response to user input, various settings can be provided that control the display of the activity data. In the activity pane, activity data representing an action is displayed by generating a graphical representation 306 of the action including an indication 308 of the user that performed the action, which can include a name, user name and/or picture of the user, and a body 310 of the action, which is typically text, but can include other data describing the action as well as other visual appearance parameters related to the action. This graphical representation 306 of an action can be generated using a variety of data accessible through the activity data describing the action. Graphical elements in the graphical representation of the action can include one or more controls 312, such as buttons, that allow an end user to provide input with respect to a displayed action. The invention is not limited to any particular kind of display of the activity data.

The graphical user interface for the end user application can include a comments pane 320 in which the end user application displays one or more comments associated with the electronic document. In response to user input, various settings can be provided that control the display of the comment data. In the comments pane, a comment is displayed by generating a graphical representation 324 of the comment including an indication 326 of the user that created the comment, which can include a name, user name and/or picture of the user, and the body 328 of the comment, which is typically text but can include other data, as well as other visual appearance parameters related to the comment. This graphical representation 324 of a comment can be generated using a variety of data accessible through the data for the comment. Graphical elements in the graphical representation of the comment can include one or more controls 330, such as buttons, that allow an end user to provide input with respect to a displayed comment. The invention is not limited to any particular kind of display of the comment data. The display of the comment data also can be integrated with the display of the structure and content of the electronic document in the document pane.

In some instances, input provided by a user with respect to an action or a comment, such as through controls 312 or 330, can be treated as user interaction information with respect to activity data, or as outcome information with respect to a notification, as described in more detail below. Such inputs can be recorded, in some instances, as further actions or comments. Such inputs can be processed by an activity module (see FIG. 4) or the activity service (se FIG. 1) into data about user interaction with activity data or an outcome of a notification. For example, in response to a document opening, the actions in the activity data can be displayed based on time, with the most recent actions being presented first. In response to a user manipulating a control for a displayed action, such manipulation information can be processed by the activity module (FIG. 4) or activity service (FIG. 1). The activity service can update notification history data (see FIG. 5 below) to indicate that there was a user interaction with respect to the activity data related to a notification, which can indicate the efficacy of the notification.

The activity pane and comments pane also can be implemented using other graphical user interface techniques. A modal dialog box, a call-out interface, or small pop-up window, also are examples of a kind of interface that can be shown in the context of the currently accessed electronic document.

Figure 4:
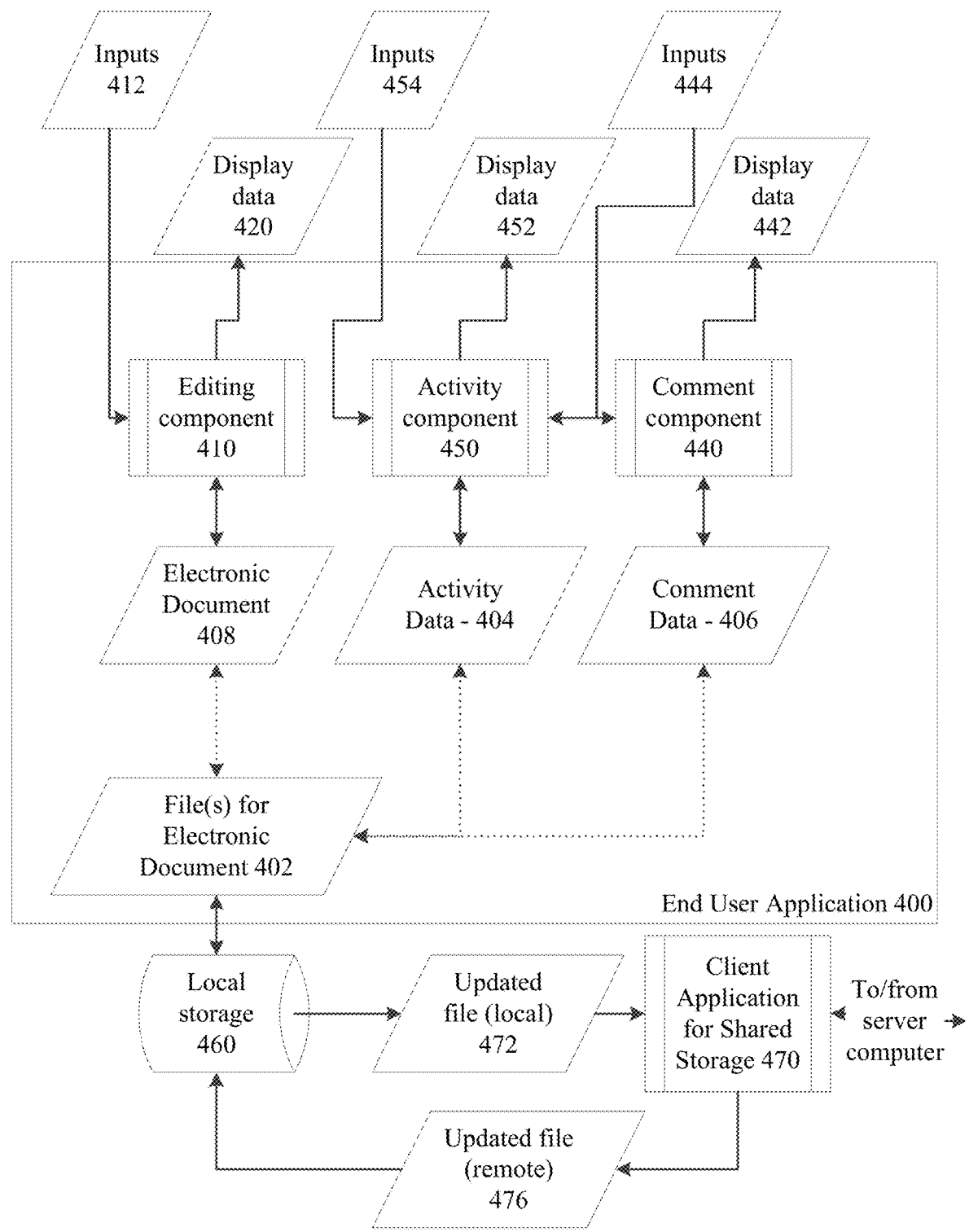
FIG. 4 is a data flow diagram of an illustrative example of a client computer configured to edit electronic documents.

FIG. 4 is a data flow diagram of an example implementation of an end user application 400, running on a client computer, which includes a comment pane and an activity pane such as shown in FIG. 3. It should be understood that the implementation as described in connection with FIGS. 3 and 4 is merely an example implementation of an end user application and that a wide variety of other implementations are possible. The end user application 400 has an input to receive one or more files 402 and/or other data defining the electronic document. The end user application generates, in memory, representations of activity data 404 as data representing a collection of actions, and comment data 406 as data representing a collection of comments, based on the received one or more files.

The files 402 may be received from local storage 460 and/or from a shared storage system (such as 100 in FIG. 1). In many shared storage systems, the files in local storage 460 are synchronized with copies of the files on a server computer in the shared storage system. For example, the end user computer can include a client application 470 for shared storage that periodically transmits an updated file 472 of the electronic document from the local storage 460 to the server computer. The server computer then transmits a copy of the electronic document received from one client computer to the other client computers that are using that electronic document. The client application 470 for the shared storage receives an updated file 476 of the electronic document from the server computer, and then updates the copy in local storage 460.

The end user application also processes the structure and content of the electronic document into memory to generate a representation of the electronic document 408, which is edited through an editing component 410. The editing component has inputs to receive user and system inputs 412 involved in the editing and storing of the electronic document, and outputs to provide display data 420 representing the electronic document being edited, and outputs to provide a modified electronic document back to storage as a file 402 upon saving. The end user application displays the display data 420 through a graphical user interface, which can include one or more displays and/or other output devices.

A comment component 440 manages interaction with the comment data 406. For example, the comment component generates display data 442 for a comment pane to be displayed in the graphical user interface 416 using the comment data 406. Also, the comment component can be responsive to inputs 444, such as adding a comment, deleting a comment, editing a comment, replying to a comment and resolving a comment, to update the comment data 406. The comment component also can interactively update the display of the comments in response to updates to the comment data and/or user input.

An activity component 450 manages interaction with the activity data 404. For example, the activity component generates display data 452 for an activity pane to be displayed in the graphical user interface using the activity data 404. Also, the activity component can be responsive to inputs 454 for actions with respect to the electronic document, and with respect to the structure, content and/or activity data of the electronic document, and other inputs 444 for actions related to comments, to update the activity data for the electronic document. The activity component 450 also can interactively update the display of actions in response to updates to the activity data and/or user input. This component also can, in response to user input with respect to a displayed action, provide corresponding user interaction information to the activity service or notification service (FIG. 1), for use in tracking efficacy of notifications and activity data.

It should be understood that the foregoing is just one example implementation of a collaborative editing system in which actions with respect to electronic documents, action related to comments in electronic documents and other types of actions related to electronic documents are stored, in a way that relates them to the electronic document. Implementations of such systems will vary at least in the type of data stored, in the manner in which such data is stored, and in how such data is collected from end user applications, and yet other applications such as communication applications and the shared storage system.

Given the foregoing example implementation of an operating context for a notification service, the following is an example implementation of a notification service that processes activity data, and manages generating notifications, based on user roles to reduce message generation, processing, storage and transmission.

Figure 5:
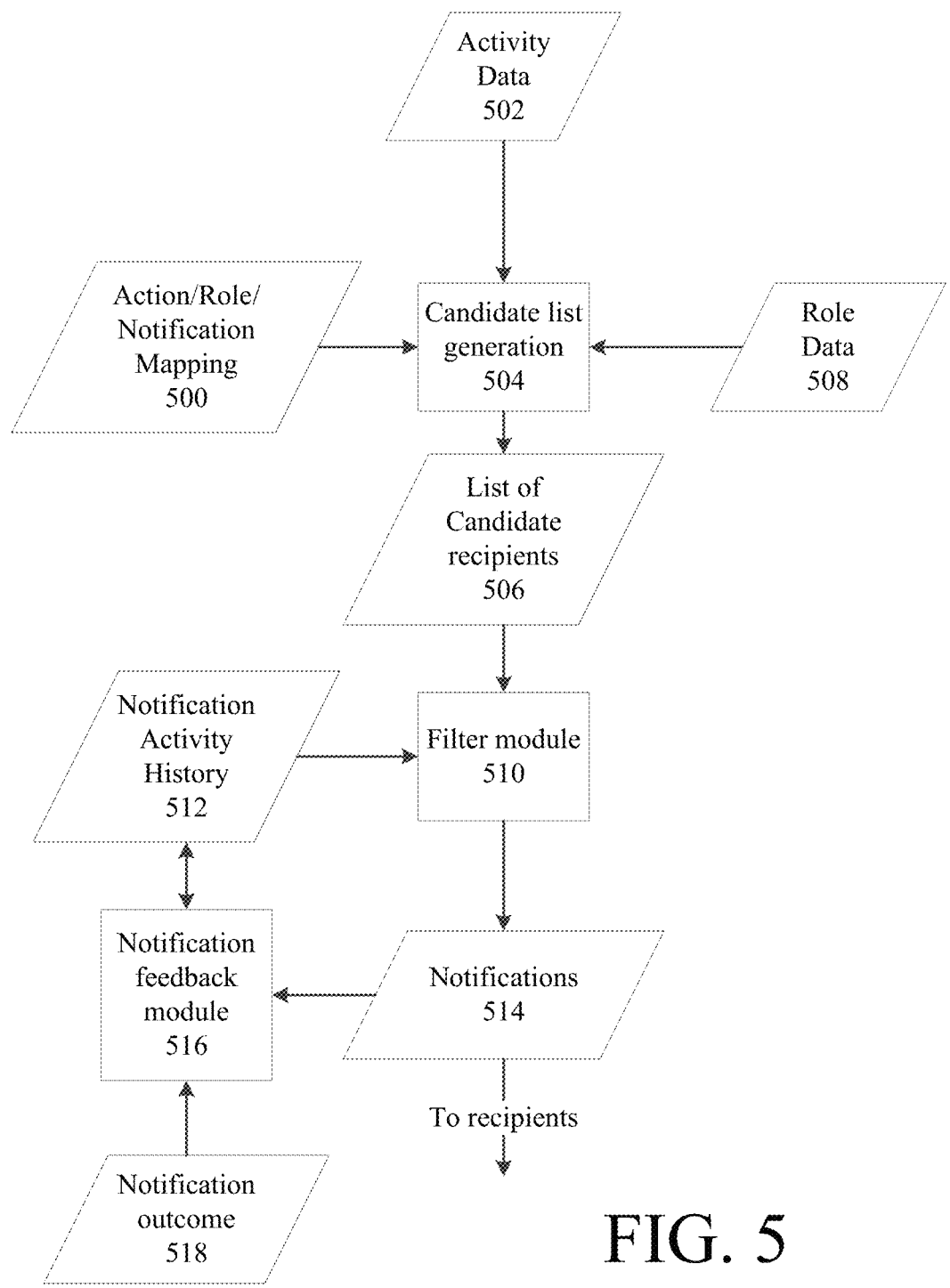
FIG. 5 is a data flow diagram of an illustrative example of a notification service.

Turning now to FIG. 5, a dataflow diagram of an example implementation of a notification service 150 will now be described. Such a notification service can be implemented on one or more server computers that interact with other components of the shared storage system, such as the activity service 130 and user information service 160 to generate messages to end users.

As noted above, the notification service accesses mapping data 500 associating actions with roles and notifications for those actions and roles. A notification can have an associated priority or importance level. Given activity data 502, including at least data describing an action and an electronic document to which that action is related, a candidate list generation module 504 determines roles associated with an action from the mapping data 500. The candidate list generation module then generates a list of candidate recipients 506 for the notification by using role data 508 to identify entities having the role or roles, associated with the action, with respect to the electronic document for which the action occurred. The role data can originate from a user identification service, the shared storage system, the electronic document and/or an analysis of information from these sources.

There are several kinds of roles that can be considered with respect to actions related to electronic documents.

Some roles can be based on content, e.g., comment data and/or activity data, associated with the electronic document. For example, one role is a creator of, or participant in, a comment thread in the electronic document. Another role is an editor of the electronic document who has made changes to the electronic document. Another role is a person mentioned in the electronic document, such as in a comment.

Some roles can be based on information maintained by the file system. For example, a role is an owner of the electronic document, or a creator of the electronic document. Another role is an entity with whom the electronic document has been shared. An entity with whom an electronic document has been shared can be further qualified by the access rights provided to that entity, such as read-only access or read and write access.

Yet other roles can be determined from processing activity data from the activity service. For example, by analyzing the activity data for an electronic document over time, a user with whom a document has been shared can be classified in a role based on the level of activity. For example, a person who has never edited the document may be classified as a "reader"; whereas a person who has edited the document frequently may be classified as an "active editor". The role may be based on the level of activity over a most recent period of time, such as a recently active editor or a formerly active editor.

Some roles can be based on other information, such as relationships among people maintained by other applications of a system, such as a user information service. For example, a role may be a manager of a person, such as a supervisor of a current owner of the document. As another example, a role may be a team member of team including a person. Another role is a person with whom an author or editor of the electronic document has communicated with, e.g., through a communication application, about the electronic document.

As an example, if the activity data 502 indicates that a reply to a comment was added in an electronic document, then candidate list generation module 504 accesses the mapping data 500 to determine which roles are related to comment replies. For example, the creator of the comment thread, other participants in the comment thread and the owner of the document may be roles identified in mapping 500. As another example, the creator of the comment thread, other participants in the comment thread, the owner of the document and all other entities with whom the electronic document is shared with write access may be roles identified in mapping 500.

Given the identified roles, the candidate list generation module 504 accesses the role data 508, according to the roles identified by the mapping 500 and an identifier of the electronic document to which the action relates. Using the example of an action that is a reply to a comment, the candidate list generation module can access, from the file system, user identifiers for users that are owners of the electronic document or for users with whom the document was shared. From the comment data for the electronic document, the candidate list generation module can access user identifiers for users that have participated in the comment thread.

The resulting set of user identifiers provides the list of candidate recipients 506 for a notification related to the action being processed. It should be understood that the activity data 502 can include multiple actions to be processed. For each action, the candidate generation module 504 generates a list of candidate recipients for a corresponding notification. The activity data 502 can be periodically read from activity data stored for electronic documents. Alternatively, the activity data can be in the form of a queue in memory, to which an activity service (e.g., 130, FIG. 1) adds actions to be processed when corresponding activity data (e.g., FIG. 2) are stored for electronic documents.

In one implementation, the end user application or activity service or other application can determine, for each action stored, the set of user identifiers for users to whom a notification will be sent, and can store such information in the activity data (208 in FIG. 2). In such an implementation, the notification service can manage sending notifications to the identified users.

Given the list of candidate recipients for an action, a filter module 510 of the notification service can determine whether notifications about the action are sent to each individual represented in the list. Such a filter module 510 can use data from a notification activity history 512. In general, as the filter module 510 determines that notifications 514 are to be sent, data about these notifications are maintained in a notification activity history 512 by a notification feedback module 516.

A data structure, stored in memory or in a data file or database on nonvolatile storage, can store the data for the notification activity history 512. For example, the notification activity history can store, for each notification sent to an end user, a user identifier for the user to whom the notification was sent, an identifier of the action that triggered the notification, and data representing any response received to the notification, as indicated by notification outcome 518. Different kinds of notification outcomes include but are not limited to a receipt, indicating the user acknowledged receipt of the notification, or other data indicating the user opened the document in response to the notification, such as by accessing the document through a link in the notification or accessing the document in a specified period of time after receiving the notification. How such outcomes can be monitored and stored into a notification activity history is discussed in more detail below. Yet other information also can be stored about the notification, such as a date and time sent, communication channel through which the notification was sent and other metadata.

In one implementation, the identifiers of the users to whom the notification is sent, and any outcome of the notification, can be stored as part of the activity data (e.g., 208 in FIG. 2). In other words, the activity data can be augmented to include the user identifiers, as noted above, and fields for tracking corresponding notification information, such that the augmented activity data also can be used as the notification activity history. Alternatively, the activity identifier can be used to link actions from activity data with corresponding notifications in a separately stored notification activity history.

Given an action and a set of user identifiers for notifications for the action, the filter module 510 can apply or implement one or more rules which can limit the number of notifications sent. For example, if the notification history indicates that, for a given user identifier, a prior notification has not resulted in a response, further notifications to that user identifier can be postponed or eliminated. As another example, if the notification history indicates that, for a given user identifier, a prior notification was transmitted less than a set time ago, then further notifications to that user identifier can be postponed or eliminated. As another example, such rules can incorporate a priority, such that notifications of lower priority than a preceding notification can be postponed or eliminated, but a notification of higher priority than a prior notification can be sent. Notifications to an individual can be aggregated until a notification of sufficient priority can be sent to that individual, or simply to limit the notification load for that user.

The filter module 510 can apply rules that can be determined adaptively in response to analyses of the notification activity history, such as by a computer program that performs statistical analyses, which can be part of the notification feedback module 516. For example, the data stored in the notification activity history can be processed to determine which activities are most relevant to users generally, or to users in specific roles, or to specific users. For example, when the notification activity history includes data indicating whether a document has been opened, statistical analysis of the data can show which activities have the highest document open rates. For example, if 90 out of 100 of notifications related to the activity of "reply to a comment" resulted in the corresponding electronic document being opened by the recipient of the notification, then such a notification type would be considered to have a high document open rate. Statistical analysis also can determine how frequently users open documents directly or indirectly from a notification, such as on a per role, per user, per activity or other basis.

The filter module 510 can use results of such statistical analyses, for example in applying rules to whether a notification can be sent to a user. As an example, after sending a first notification to a user about a document, if there is a second notification to be sent to that user, the filter module can determine whether to send the second notification based on whether that notification has a higher or lower document open rate than the first notification sent to that user.

Such statistical analyses also can be used, for example, to set priorities for notifications, to identify roles for receiving notifications, and to define rules for filtering notifications to be sent. For example, notifications for activities which result in high document open rates can be given higher priority; notifications for activities which result in low document open rates can be given lower priority. Such statistical analyses can be used in a more comprehensive machine learning framework so as to continually adapt rules for selecting roles for receiving notifications for an action type, for setting priorities for such notifications, and for applying filters to sending notifications to identified users.

The statistical analyses possible are dependent on the data stored for outcomes as part of the notification activity history. For example, in addition to tracking receipts, document open actions through a link in a notification, and document open actions after a notification, other actions that can be tracked as responses to a notification include, but are not limited to, replying to a comment after a notification about the comment; adding a comment in response to an edit; or making an edit in response to being mentioned in a document; or requesting permission to access a document. In general, statistical analysis of such data determines, for different types of activities, which user roles or specific users, perform some other action in response to a notification. Such information then can be used to send notifications to users about actions which are more likely to result in those users performing an action; other candidate notifications may otherwise not be sent.

As noted above, in connection with the description of FIGS. 3 and 4, the notification activity history and/or activity data also can include information on a per-user basis of how the user interacts with the related activities when viewing the electronic document, for example based on input with respect to controls presented with respect to activities and comments. By tracking interactions with respect to activities in the end user application, the statistical analyses also can determine not only the relationship of the notifications to these activities, but also user preferences and usage patterns with respect to different activity types, thus identifying activities that are most useful and applicable to a specific user. Such information can be used for a variety of purposes. For example, an end user application can use such information when displaying activities in the activity pane (FIG. 3). Upon opening a document, the end user application can display the activities that have occurred in the document since the end user last viewed the document, and these activities can be displayed in an order based on the importance of the activities to that end user.

Figure 6:
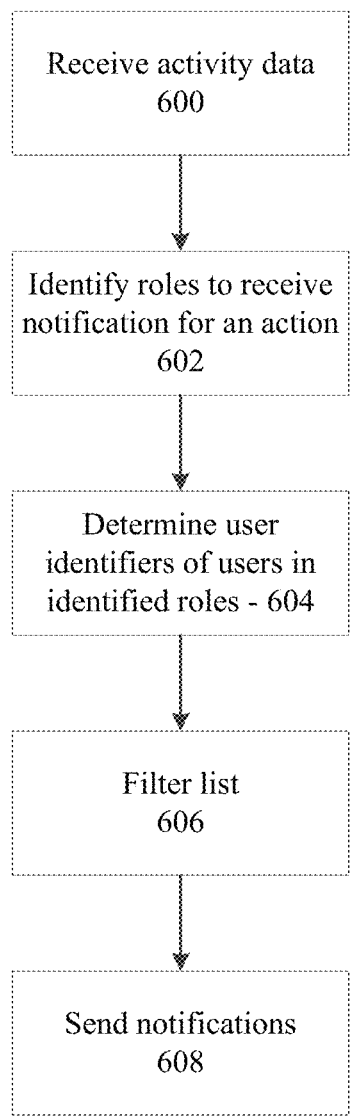
FIG. 6 is a flowchart of operation of an example implementation of the notification service in FIG. 5.

Turning now to FIG. 6, a flowchart of operation of an example implementation of the notification service in FIG. 5, for generating notifications, will now be described.

The notification service receives 600 activity data, indicating an action performed by an end user with respect to an electronic document. The activity data can include, for example, an activity identifier identifying the particular activity, an action identifier indicating the type of action performed, a user identifier identifying a user performing the action, and a document identifier, identifying the electronic document. The notification service identifies 602 roles corresponding to the action for which notifications will be generated to users in the identified roles.

Given the identified roles, the notification service determines 604 user identifiers for users in these roles. As noted above, the roles may depend on information from activity data for the electronic document, sharing state data from the file system, user relationship information from communication applications or other applications, and the like. The users in these roles may have already been identified, such as by an end user application or by an activity service or by a user information service, and these user identifiers may be stored with the activity data that was received by the notification service.

The notification service then filters 606 the list of user identifiers, as a candidate list, based on information from a notification activity history, such as priority, outcomes of prior notifications and other data. Some notifications may be deleted; other may be stored for later action. The notification service then sends 608 notifications about the action to end users. Notifications can include, for example, an indication of the action performed, an indication of the user performing the action, and the related electronic document. A link to the electronic document, permitting access to the electronic document, can be included in the notification.

Figure 7:
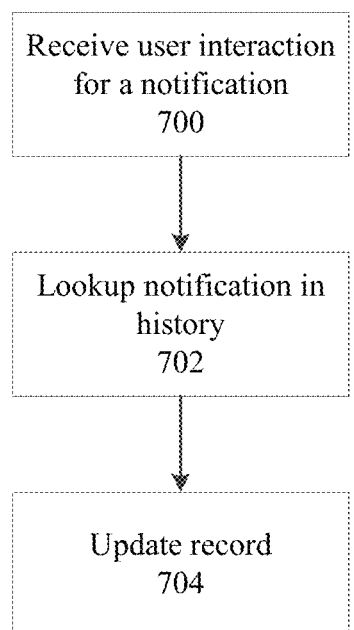
FIG. 7 is a flowchart of operation of an example implementation of notification tracking.

Turning now to FIG. 7, a flowchart of operation of an example implementation of notification tracking will now be described.

The notification service receives 700 user interaction data related to a notification. In general such user interaction identifies an end user, an activity (for which a notification has been sent) and an outcome or user interaction information by the end user with respect to the notification or activity. For example, the user interaction data can include a read receipt for a notification from an end user's communication application. As another example the user interaction data can include an indication that a link in the notification was used to open the document. As another example, an activity service can determine that an end user opened the document associated with the notification within a time period since the action in the notification occurred. As another example, an activity service can determine that an end user interacted with the activity data in an application within a time period since the activity occurred.

Given the received user interaction data, the notification service looks up 702 the notification corresponding to the user interaction information in the notification activity history. For example, the activity identifier and user identifier in the user interaction information can be used to identify a corresponding record for the notification in the notification activity history. This record is then updated 704 based on the other interaction information, e.g., read receipt, document open, activity interaction, that has been received.

The notification feedback module of FIG. 5 can perform these operations in FIG. 7. In some implementations, the activity service, or other service, and process information which can be provided to the notification feedback module for storage in the notification activity history.

Figure 8:
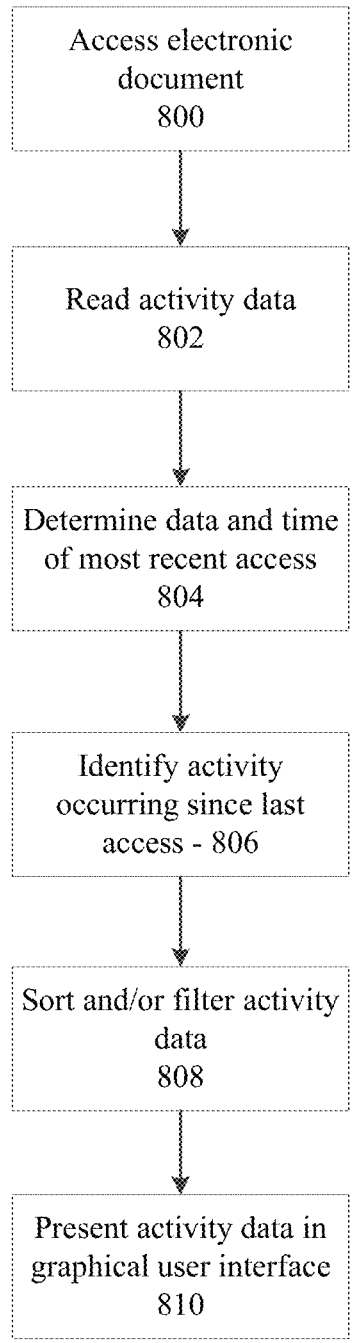
FIG. 8 is a flowchart of operation of an example implementation of opening a document in an end user application.

Turning now to FIG. 8, a flowchart of operation of an example implementation of opening a document in an end user application will now be described. This flow chart illustrates how the end user application, when opening a document, can present activities that are most relevant to the end user, such as in the activity pane in FIG. 3.

When an end user opens an electronic document with an end user application, the end user application accesses 800 the electronic document from the shared storage system. In addition to reading the various data (e.g., FIG. 2) for the electronic document, the end user application reads 802 the activity data for processing for presentation in the activity pane (FIG. 3). Such processing can include determining 804 a date and time for a most recent time the electronic document was accessed by the end user. The end user application then identifies 806 any activity data occurring after the determined data and time. From among this activity data, the end user application can use information derived from the notification activity history information to sort and/or filter 808 the activity data so that the most relevant activity data to the end user is then presented 810 in the graphical user interface, such as in the activity pane in FIG. 3.

Figure 9:
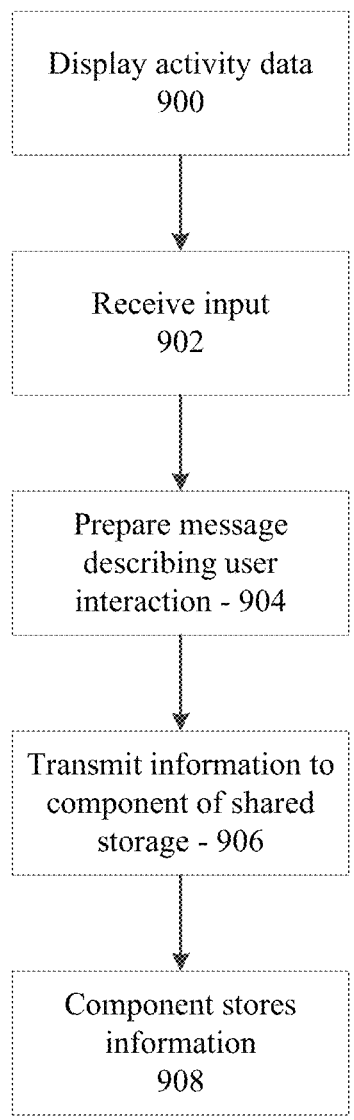
FIG. 9 is a flowchart of operation of an example implementation of tracking user interactions with respect to an activity.

After activity data has been displayed in the activity pane, the end user application also can track user interaction with respect to the activity data. Turning now to FIG. 9, a flowchart of operation of an example implementation of tracking user interactions with respect to an activity will now be described. Such an operation generally is performed, at least in part, by the end user application, coordinating with the shared storage system to store the user interaction information. In this example, it is assumed that user interaction information is stored as part of the notification activity history, which associates activities and users to whom notifications about those activities have been sent. In other implementations, such user interaction information can be stored as part of the activity data. In yet other implementation, user interaction information can be stored in a separate data structure.

In FIG. 9, an end user application displays 900 activity data in an activity pane of a graphical user interface (e.g., FIG. 3). The end user application can receive 902 inputs representing a user interaction, such as manipulation of a control, with respect to an activity. In response to receiving such an input, the end user application formats 904 a message for storing this information, including at least an activity identifier, a user identifier, and other data describing the user interaction, such as a type of action, and/or a date and time of the action. The end user application can transmit 906 this information to a component of the shared storage system, such as a notification feedback module (FIG. 5). The component of the shared storage system stores 908 this information for later analysis.

Figure 10:
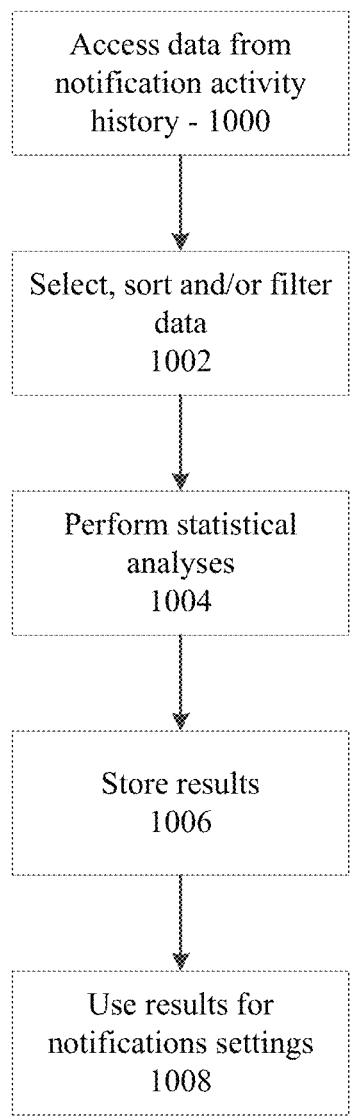
FIG. 10 is a flowchart of operation of an example implementation of analyzing a notification activity history.

Turning now to FIG. 10, a flowchart of operation of an example implementation analyzing a notification activity history will now be described. In one implementation, the notification feedback module of FIG. 5 can perform these operations in FIG. 10. FIG. 10 will be described in the context of an "analysis module" performing these steps, where the analysis module is a computer program executing on a computer to perform the analysis of the notification activity history. Such processing can be performed periodically to update information about notification priorities, mappings of activities to roles for notifications, filtering notifications, and how activity data is presented in end user applications.

As a preliminary step, the analysis module accesses 1000 data from the notification activity history and/or activity data and/or user interaction data for activities. As described above, such data can include data for a plurality of activities, a plurality of action types, and a plurality of user identifiers. The data also can include, for any activity/user pair, any outcome information about that activity, such as whether a notification about the activity was sent, received, or resulted in a document opening, or whether subsequent to such a notification the activity was otherwise acted upon by the user. The analysis module can select, sort and/or filter 1002 the accessed data by any desired parameter, such as by activity identifier, action type, or user identifier. The analysis module then performs 1004 one or more statistical analyses on the subset of data. The results of such statistical analyses can be stored 1006 and/or used 1008 in the rest of the system for the various purposes described herein, for notifications settings, such as setting priorities for notifications, mapping activities to roles for notifications, filtering notifications, and/or presenting activity data in an end user application.

Figure 11:
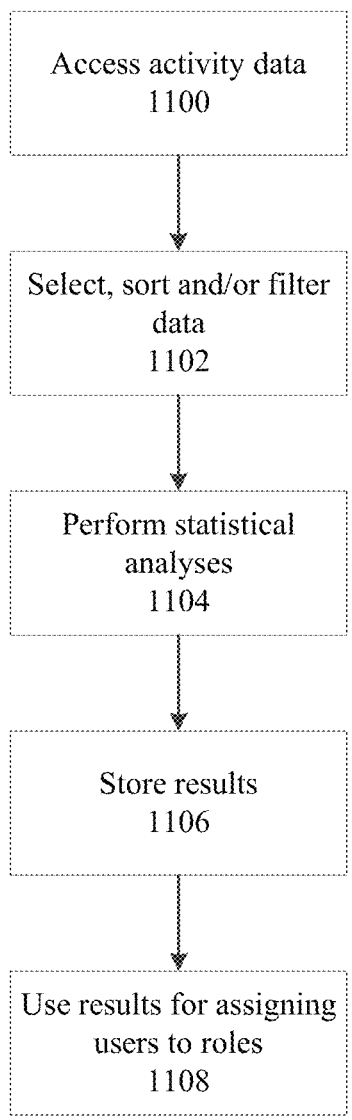
FIG. 11 is a flowchart of operation of an example implementation of analyzing activity data to adaptively define roles of end users with respect to an electronic document.

Turning now to FIG. 11, a flowchart of operation of an example implementation of analyzing activity data to adaptively define roles for end users with respect to an electronic document will now be described. In one implementation, the notification feedback module of FIG. 5 can perform these operations in FIG. 11 where the notification feedback module also accesses activity data for an electronic document. FIG. 11 will be described in the context of a "role analysis module" performing these steps, where the role analysis module is a computer program executing on a computer to perform the analysis of the activity data for a document. Such processing can be performed periodically to update information about different roles of end users with respect to different end user applications. How frequently the analyses are performed can be dependent on a measure of the level of activity on an electronic document over time.

As a preliminary step, the role analysis module accesses 1100 activity data for an electronic document from storage for a selected electronic document. As described above, such data can include data for a plurality of activities, a plurality of action types, and a plurality of user identifiers. The role analysis module can select, sort and/or filter 1102 the accessed data by action type and user identifier. The analysis module then performs 1104 one or more statistical analyses on the subset of data. The results of such statistical analyses can be stored 1106 and/or used 1108 in the rest of the system for the purpose of assigning roles to users in connection with this electronic document. Such roles may be used in connection with mappings of actions to roles for purposes of sending notifications.

By tracking and analyzing activity data, notifications, and user interactions with activity data and notifications, the system can identify, for individual users and across a set of users, which activity data and notifications are most relevant. The activity data and notifications are most relevant when they result in the end user having further user interaction through the electronic document or other end users. The information about the relevance of the activity data and notifications can be used for managing sending of notifications and for presenting activity data in end user applications. Managing notifications and activity data in this way lowers utilization of many system resources, including but not limited to processing, storage, bandwidth and power, by the notification service, intermediate devices that process messages and activity data, such as servers and networking equipment, and end user devices that receive messages. It also improves productivity of users by providing more relevant notifications and activity data.

Figure 12:
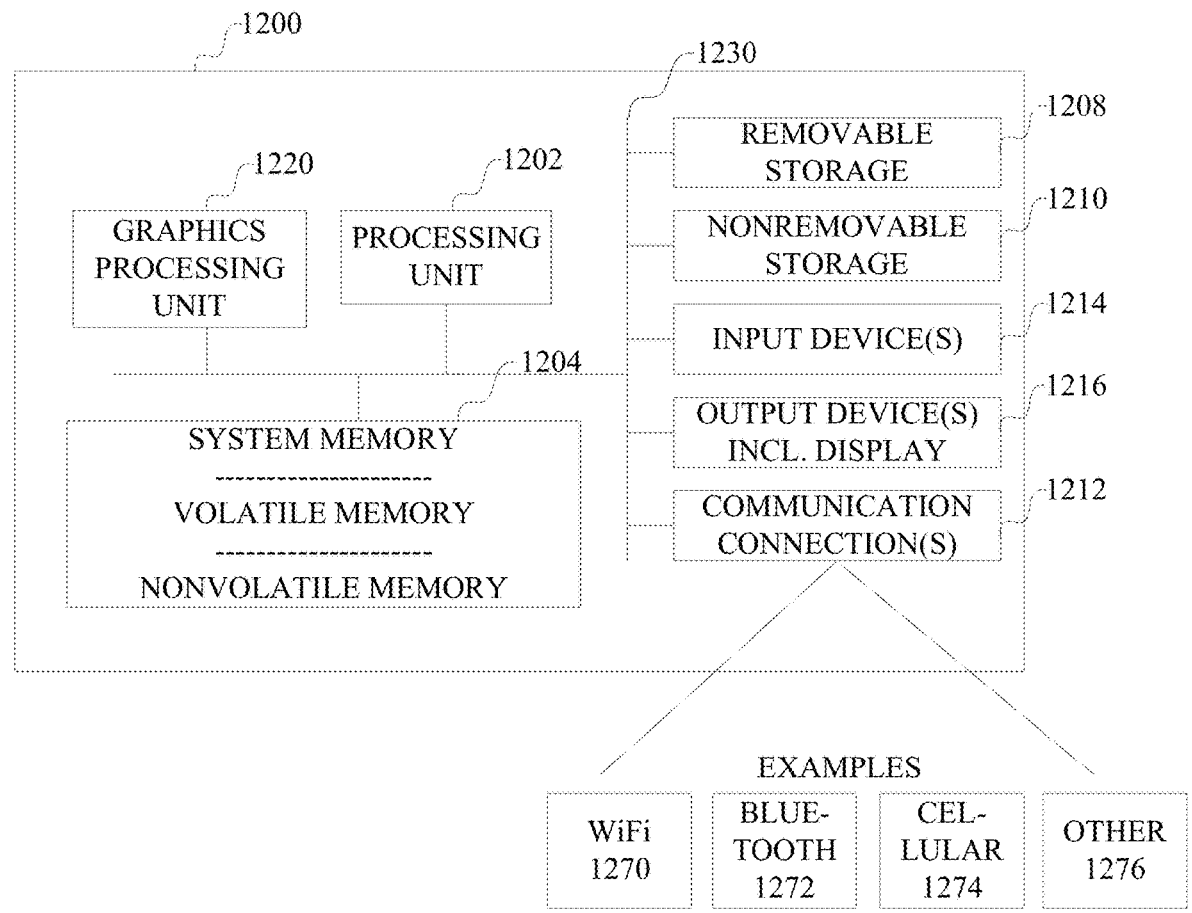
FIG. 12 is a block diagram of an example computer.

Having now described an example implementation, FIG. 12 illustrates an example of a computer with which components of the computer system of the foregoing description can be implemented. This is only one example of a computer and is not intended to suggest any limitation as to the scope of use or functionality of such a computer.

The computer can be any of a variety of general purpose or special purpose computing hardware configurations. Some examples of types of computers that can be used include, but are not limited to, personal computers, game consoles, set top boxes, hand-held or laptop devices (for example, media players, notebook computers, tablet computers, cellular phones including but not limited to "smart" phones, personal data assistants, voice recorders), server computers, multiprocessor systems, microprocessor-based systems, programmable consumer electronics, networked personal computers, minicomputers, mainframe computers, and distributed computing environments that include any of the above types of computers or devices, and the like.

With reference to FIG. 12, a computer 1200 includes a processing system comprising at least one processing unit 1202 and at least one memory 1204. The processing unit 1202 can include multiple processing devices; the memory 1204 can include multiple memory devices. A processing unit 1202 comprises a processor which is logic circuitry which responds to and processes instructions to provide the functions of the computer. A processing device can include one or more processing cores (not shown) that are multiple processors within the same logic circuitry that can operate independently of each other. Generally, one of the processing units in the computer is designated as a primary processor, typically called the central processing unit (CPU). One or more additional co-processing units 1220, such as a graphics processing unit (GPU), also can be present in the computer. A co-processing unit comprises a processor that performs operations that supplement the central processing unit, such as but not limited to graphics operations and signal processing operations.

The memory 1204 may include volatile computer storage devices (such as dynamic random access memory (DRAM) or other random access memory device), and non-volatile computer storage devices (such as a read-only memory, flash memory, and the like) or some combination of the two. A nonvolatile computer storage device is a computer storage device whose contents are not lost when power is removed. Other computer storage devices, such as dedicated memory or registers, also can be present in the one or more processors. The computer 1200 can include additional computer storage devices (whether removable or non-removable) such as, but not limited to, magnetically-recorded or optically-recorded disks or tape. Such additional computer storage devices are illustrated in FIG. 1 by removable storage device 1208 and non-removable storage device 1210. Such computer storage devices 1208 and 1210 typically are nonvolatile storage devices. The various components in FIG. 12 are generally interconnected by an interconnection mechanism, such as one or more buses 1230.

A computer storage device is any device in which data can be stored in and retrieved from addressable physical storage locations by the computer by changing state of the device at the addressable physical storage location. A computer storage device thus can be a volatile or nonvolatile memory, or a removable or non-removable storage device. Memory 1204, removable storage 1208 and non-removable storage 1210 are all examples of computer storage devices. Some examples of computer storage devices are RAM, ROM, EEPROM, flash memory or other memory technology, CD-ROM, digital versatile disks (DVD) or other optically or magneto-optically recorded storage device, magnetic cassettes, magnetic tape, magnetic disk storage or other magnetic storage devices. Computer storage devices and communication media are distinct categories, and both are distinct from signals propagating over communication media.

Computer 1200 may also include communications connection(s) 1212 that allow the computer to communicate with other devices over a communication medium. Communication media typically transmit computer program instructions, data structures, program modules or other data over a wired or wireless substance by propagating a modulated data signal such as a carrier wave or other transport mechanism over the substance. The term "modulated data signal" means a signal that has one or more of its characteristics set or changed in such a manner as to encode information in the signal. By way of example, and not limitation, communication media includes wired media, such as metal or other electrically conductive wire that propagates electrical signals or optical fibers that propagate optical signals, and wireless media, such as any non-wired communication media that allows propagation of signals, such as acoustic, electromagnetic, electrical, optical, infrared, radio frequency and other signals.

Communications connections 1212 are devices, such as a wired network interface, wireless network interface, radio frequency transceiver, e.g., WiFi 1270, cellular 1274, long term evolution (LTE) or Bluetooth 1272, etc., transceivers, navigation transceivers, e.g., global positioning system (GPS) or Global Navigation Satellite System (GLONASS), etc., transceivers, and network interface devices 1276, e.g., Ethernet, etc., or other device, that interface with communication media to transmit data over and receive data from signal propagated over the communication media.

The computer 1200 may have various input device(s) 1214 such as a pointer device, keyboard, touch-based input device, pen, camera, microphone, sensors, such as accelerometers, thermometers, light sensors and the like, and so on. The computer 1200 may have various output device(s) 1216 such as a display, speakers, and so on. Such devices are well known in the art and need not be discussed at length here. Various input and output devices can implement a natural user interface (NUI), which is any interface technology that enables a user to interact with a device in a "natural" manner, free from artificial constraints imposed by input devices such as mice, keyboards, remote controls, and the like.

Examples of NUI methods include those relying on speech recognition, touch and stylus recognition, gesture recognition both on screen and adjacent to the screen, air gestures, head and eye tracking, voice and speech, vision, touch, gestures, and machine intelligence, and may include the use of touch sensitive displays, voice and speech recognition, intention and goal understanding, motion gesture detection using depth cameras (such as stereoscopic camera systems, infrared camera systems, and other camera systems and combinations of these), motion gesture detection using accelerometers or gyroscopes, facial recognition, three dimensional displays, head, eye, and gaze tracking, immersive augmented reality and virtual reality systems, all of which provide a more natural interface, as well as technologies for sensing brain activity using electric field sensing electrodes (EEG and related methods).

The various computer storage devices 1208 and 1210, communication connections 1212, output devices 1216 and input devices 1214 can be integrated within a housing with the rest of the computer, or can be connected through various input/output interface devices on the computer, in which case the reference numbers 1208, 1210, 1212, 1214 and 1216 can indicate either the interface for connection to a device or the device itself as the case may be.

A computer generally includes an operating system, which is a computer program that, when executed, manages access, by other applications running on the computer, to the various resources of the computer. There may be multiple applications. The various resources include the memory, storage, input devices and output devices, such as display devices and input devices as shown in FIG. 1. To manage access to data stored in nonvolatile computer storage devices, the computer also generally includes a file system which maintains files of data. A file is a named logical construct which is defined and implemented by the me system to map a name and a sequence of logical records of data to the addressable physical locations on the computer storage device. Thus, the file system hides the physical locations of data from applications running on the computer, allowing applications to access data in a file using the name of the file and commands defined by the file system. A file system generally provides at least basic file operations such as creating a file, opening a file, writing a file or its attributes, reading a file or its attributes, and closing a file.

The various modules, tools, or applications, and data structures and flowcharts of FIGS. 1-11, as well as any operating system, file system and applications on a computer in FIG. 12, can be implemented using one or more processing units of one or more computers with one or more computer programs processed by the one or more processing units.

A computer program includes computer-executable instructions and/or computer-interpreted instructions, such as program modules, which instructions are processed by one or more processing units in the computer. Generally, such instructions define routines, programs, objects, components, data structures, and so on, that, when processed by a processing unit, instruct or configure the computer to perform operations on data, or configure the computer to implement various components, modules or data structures.

Alternatively, or in addition, the functionality of one or more of the various components described herein can be performed, at least in part, by one or more hardware logic components. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

Accordingly, in one aspect, a shared storage system includes a server computer comprising a network interface configured to connect the shared storage system to a computer network connected to a plurality of end user computers, a computer storage device, and a processing system executing a file system providing access to a plurality of electronic documents in the computer storage device. The processing system further executes computer program code that configures the server computer to include an activity service and a notification service. The activity service is operative to process, and store in the computer storage device, activity data representing actions related to the plurality of electronic documents, the activity data including, for an action related to an electronic document, an identifier of the action, an identifier of a type of the action, and an identifier of a user performing the action. The notification service is operative to process the activity data, according to a mapping of actions to user roles, to associate additional users with the actions in the activity data according to the user roles.

In one aspect, the server computer is further operative to track user interaction data for the additional users with respect to the activity data.

In one aspect, the server computer is further operative to process the activity data for the electronic document to determine roles for end users of the electronic document.

In another aspect, a computer-implemented process comprises processing activity data representing actions related to a plurality of electronic documents, the activity data including, for an action related to an electronic document, an identifier of the action, an identifier of a type of the action, and an identifier of a user performing the action. This activity data is stored in a computer storage device. The activity data is processed, according to a mapping of actions to user roles, to associate additional users with the actions in the activity data according to the user roles.

In one aspect, the process includes tracking user interaction data for the additional users with respect to the activity data.

In one aspect, the process includes processing the activity data for the electronic document to determine roles for end users of the electronic document.

In another aspect, a computer-system includes means for processing activity data, according to a mapping of actions to user roles, to associate additional users with the actions in the activity data according to the user roles. The computer system can include means for tracking user interaction data for the additional users with respect to the activity data. The computer system can include means for processing the activity data for the electronic document to determine roles for end users of the electronic document.

In another aspect, a computer implemented process includes processing activity data, according to a mapping of actions to user roles, to associate additional users with the actions in the activity data according to the user roles. The process can include tracking user interaction data for the additional users with respect to the activity data. The process can include processing the activity data for the electronic document to determine roles for end users of the electronic document.

In any of the foregoing aspects, the notification service is operative to send notifications to the additional users.

In any of the foregoing aspects, to track user interaction, the notification service is operative to track outcomes of notifications sent to the additional users.

In any of the foregoing aspects, the server computer is further operative to process the tracked outcomes of notifications sent to the additional users to identify relevant notifications.

In any of the foregoing aspects, the server computer is further operative to modify the mapping of actions to user roles according to the processing of the tracked outcomes.

In any of the foregoing aspects, the server computer is further operative to receive, from an end user application used by one of the additional users, user interaction information with respect to displayed information about an action.

In any of the foregoing aspects, an electronic document comprises data defining structure and content of the electronic document, data defining comments associated with the electronic document, and actions associated with the electronic document.

In any of the foregoing aspects, the actions can include data describing actions performed by users and associated with the electronic document.

In any of the foregoing aspects, the actions can include actions with respect to the electronic document. Such actions can include, but are not limited to, opening, saving or closing a document, sharing the document, and changing permissions of the document.

In any of the foregoing aspects, the actions can include actions with respect to comments in the electronic document. Such actions can include, but are not limited to, adding, editing or deleting a comment, replying to a comment, marking a comment as resolved, and marking a comment as unresolved.

In another aspect, an article of manufacture includes at least one computer storage medium, and computer program instructions stored on the at least one computer storage medium. The computer program instructions, when processed by a processing system of a computer, the processing system comprising one or more processing units and storage, configures the computer as set forth in any of the foregoing aspects and/or performs a process as set forth in any of the foregoing aspects.

Any of the foregoing aspects may be embodied as a computer system, as any individual component of such a computer system, as a process performed by such a computer system or any individual component of such a computer system, or as an article of manufacture including computer storage in which computer program instructions are stored and which, when processed by one or more computers, configure the one or more computers to provide such a computer system or any individual component of such a computer system.

It should be understood that the subject matter defined in the appended claims is not necessarily limited to the specific implementations described above. The specific implementations described above are disclosed as examples only.

What is claimed is:

1. A server computer comprising:
   a network interface configured to connect the server computer to a computer network;
   a memory device storing an electronic document;
   a processing system operatively coupled to the network interface and to the memory device, the processing system executing a file system configured to provide access to the electronic document via the computer network; and
   computer-program code that, when executed by the processing system, causes the server computer to:
      receive activity data representing an action performed on the electronic document by a user device, the activity data including, for each action represented in the activity data, an identifier of the action, an identifier of a type of the action, and an identifier of a user device performing the action;
      associate an additional user device with the action performed on the electronic document according to a user role associated with the additional user device, in view of a mapping of at least one action performed on the electronic document to at least one user role;
      send a notification of the action performed on the electronic document to the additional user device;
      track user-interaction data for the additional user device with respect to the activity data, the user-interaction data including an outcome of the at least one notification sent to the additional user device;
      perform a statistical analysis based at least in part on the outcome of the notification, including identifying the notification as relevant if the additional user device interacts with the electronic document pursuant to receipt of the notification; and
      modify the mapping if the notification is identified as relevant.

2. The server computer of claim 1 wherein the server computer is further operative to receive, from an end user application of the additional user device, user interaction information with respect to displayed information about the action performed on the electronic document.

3. The server computer of claim 1, wherein the server computer is further operative to process the activity data for the electronic document to determine the at least one user role for each user device with access to the electronic document.

4. A server computer comprising:
   a network interface configured to connect the server computer to a computer network;
   a memory device storing an electronic document;
   a processing system operatively coupled to the network interface and to the memory device, the processing system executing a file system configured to provide access to the electronic document via the computer network; and
   computer-program code that, when executed by the processing system, causes the server computer to:
      receive activity data representing an action performed on the electronic document by a user device, the activity data including, for each action represented in the activity data, an identifier of the action, an identifier of a type of the action, and an identifier of a user device performing the action;
      associate an additional user device with the action performed on the electronic document according to a user role associated with the additional user device, in view of a mapping of at least one action performed on the electronic document to at least one user role;
      send a notification of the action performed on the electronic document to the additional user device;
      process the activity data of the additional user device to update the user role for the additional user device;

track user-interaction data for the additional user device with respect to the activity data, the user-interaction data including an outcome of the notification sent to the additional user device; and perform a statistical analysis based at least in part on the outcome of the notification, including identifying the notification as relevant if the additional user device interacts with the electronic document pursuant to receipt of the notification.

5. The server computer of claim 4, wherein the server computer is further operative to modify the mapping if the notification is identified as relevant.

6. The server computer of claim 4 wherein the server computer is further operative to receive, from an end user application associated with the additional user device, user interaction information with respect to displayed information about the action performed on the electronic document.

7. A computer-implemented process comprising:
receiving activity data representing an action performed on an electronic document by a user device, the activity data including, for each action represented in the activity data, an identifier of the action, an identifier of a type of the action, and an identifier of the user device performing the action;

associating an additional user device with the action performed on the electronic document according to a user role associated with the additional user device, in view of a mapping of at least one action performed on the electronic document to at least one user role;

sending a notification of the action performed on the electronic document to the additional user device;

tracking user-interaction data for the additional user device with respect to the activity data, the user-interaction data including an outcome of the notification sent to the additional user device;

perform a statistical analysis based at least in part on the outcome of the notification, including identifying the notification as relevant if the additional user device interacts with the electronic document pursuant to receipt of the notification; and modifying the mapping if the notification is identified as relevant.

8. The computer-implemented process of claim 7 further comprising receiving, from an end user application associated with the additional user device, user interaction information with respect to displayed information about the action performed on the electronic document.

\* \* \* \* \*